United States Patent
von Möller

(10) Patent No.: US 6,227,617 B1
(45) Date of Patent: May 8, 2001

(54) BACK SUPPORT FOR SEAT-BACKS, IN PARTICULAR FOR MOTOR VEHICLE SEATS

(75) Inventor: Moritz von Möller, Bielefeld (DE)

(73) Assignee: Megaplast S.A., Amurrio (ES)

( * ) Notice: Subject to any disclaimer, the term of this patent is extended or adjusted under 35 U.S.C. 154(b) by 0 days.

(21) Appl. No.: 09/202,164
(22) PCT Filed: Mar. 21, 1998
(86) PCT No.: PCT/EP98/01654
  § 371 Date: Dec. 9, 1998
  § 102(e) Date: Dec. 9, 1999
(87) PCT Pub. No.: WO98/45137
  PCT Pub. Date: Oct. 15, 1998

(30) Foreign Application Priority Data

Apr. 10, 1997 (DE) .......................................... 297 06 398 U

(51) Int. Cl.[7] .................................................. A47C 3/025
(52) U.S. Cl. ..................................... 297/284.4; 297/284.1
(58) Field of Search ............................. 297/284.4, 284.1, 297/284.2, 284.7, 284.8

(56) References Cited

U.S. PATENT DOCUMENTS 4,632,454 * 12/1986 Naert .
5,217,278 * 6/1993 Harrison et al. .
5,314,263    5/1994 Susuki .
5,364,162 * 11/1994 Bar et al. .
5,567,011   10/1996 Sessini .
5,704,687    1/1998 Klinger .

FOREIGN PATENT DOCUMENTS 9408492   4/1994 (WO) .

* cited by examiner

*Primary Examiner*—Milton Nelson, Jr.
(74) *Attorney, Agent, or Firm*—White & Case LLP

(57) ABSTRACT

A lumbar support for seat backs, in particular of motor vehicle seats, has a forward-bowed support plate (1). The support plate (1) is height-adjustable, moving upward and downward on guide organs that are fixed with respect to the seat back, and is also variable in its curvature through the use of a motor-driven tension bracket that can be lengthened or shortened. The tension bracket consists of bracket regions (3a and 3b) that act on upper end region (1a) and lower end region (1b) of the support plate (1). The bracket regions have thread regions of opposite handedness pointing toward one another which are externally engaged by a common rotatable sleeve (11) with appropriately designed meshing areas. The drive motor (10) is fixed to a gear case (2) arranged behind the support plate (1). The motor (10) drives gear wheels of a gearbox whose final gear wheel (13a) stands in engagement with the sleeve (11). The sleeve has inside thread regions of opposite handedness.

7 Claims, 2 Drawing Sheets

BACK SUPPORT FOR SEAT-BACKS, IN PARTICULAR FOR MOTOR VEHICLE SEATS

TECHNICAL FIELD

The invention concerns a lumbar support for seat backs in accordance with the introductory clause of Claim 1.

STATE OF THE ART

In seat backs of this nature, it is known to adjust the arch of the support plate by means of a drive motor such that the crown of the support plate stands forward in the direction of the user's back to a greater or lesser extent. Also known for this process is a motor drive, which however has the disadvantage that it must be housed outside of the support plate's area because of the size of the motor.

THE INVENTION

Based on this state of the art, the object of the invention is to design a backrest of the type specified as known in such a way that the drive is built small enough that it can be housed completely behind the arch of the support plate.

This object is achieved with the features of the novelty portion of Claim 1.

In addition to a motor drive solely for the arch of the support plate, it is also possible in the same manner to provide an additional motor drive for height adjustment of the support plate.

Preferred embodiments of the invention are shown by the dependent claims.

BEST WAY TO IMPLEMENT THE INVENTION

Figure 1:
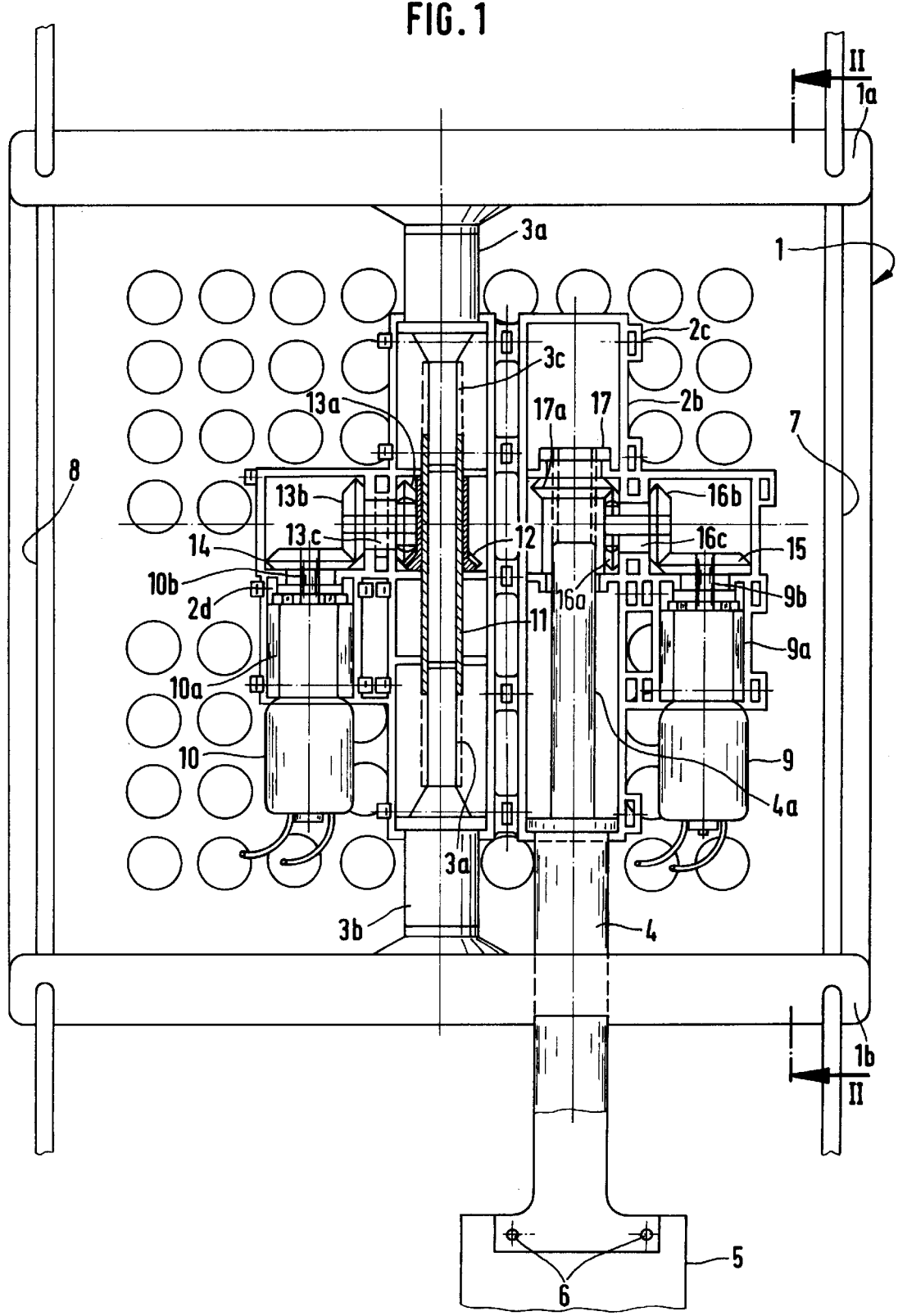
FIG. 1 shows a rear view of the support plate and drive, with housing cover removed.
Figure 2:
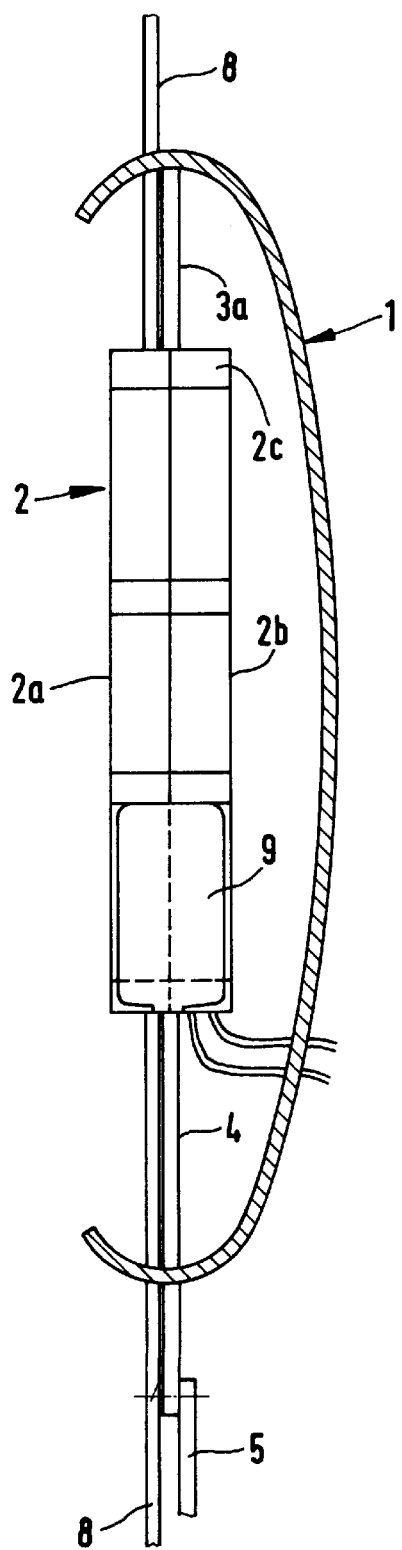
FIG. 2 shows a schematic cross-section along section line II—II in FIG. 1.

Designated as 1 is an arched support plate that arches forward in the direction of the user. The arch is adjustable in that the bracket areas 3a and 3b, which are attached to the upper and lower end regions of the support plate 1 that are bent toward the rear, are separated from one another by a shorter or longer distance.

The support plate 1 is carried in a height-adjustable manner on guide elements, which in the depicted example embodiment are guide wires 7 and 8, which pass through each of the upper and lower end regions 1a and 1b. The guide wires 7 and 8 are like-wise attached to the seat back, as is a bracket 4 that is connected by means of fastening elements (that are not shown) with a region 5 that is fixed with respect to the seat back. The bracket 4 serves for height adjustment of the support plate 1.

Adjustment of the arch is achieved through turning of a sleeve 11, which has inner thread regions of opposite handedness that engage around the appropriately designed outside thread regions 3c or 3d of the brackets 3a and 3b.

Height adjustment is achieved through turning of a sleeve 14 [sic], whose inner thread engages around the outer thread 4a of the bracket 4 that is fixed with respect to the seat back.

The two sleeves 11 and 17 are driven by means of drive motors 10 and 9.

The drive motor 10 is followed by a reducing gear 10a to whose output shaft 10b is attached a bevel gear 14. The bevel gear 14 engages a bevel gear 13b with a center region 13c, on which sits an additional bevel gear 13a. This additional bevel gear stands in engagement with an outside bevel gear region 12 of the sleeve 11.

Arranged parallel to the motor 10 is a motor 9, which like-wise has a reduction gear 9a that possesses an output shaft 9b. On the output shaft 9b sits a bevel gear 15 that meshes with a bevel gear 16b that is connected via a circular cylindrical region 16c with a bevel gear 16a. Bevel gear 16a stands in engagement with a bevel gear 17a fixed to the sleeve 17. In accordance with the direction of rotation of drive motors 9 and 10, the sleeves 11 and 17 are turned in different directions with the result that, in the case of sleeve 11, the arch becomes more or less pronounced, and in the case of sleeve 17, the sleeve travels a longer or shorter distance along the threaded region 4a so that height adjustment occurs.

The gear case consists of two identically formed case halves 2a and 2b, that lock together in a sealed position via pins 2d and eyes 2c.

What is claimed is:

1. A lumbar support for a seat back, in particular a seat back of a motor vehicle seat, the lumbar support comprising:
    a forward-bowed support plate (1) that is height-adjustable, moving upward and downward on guide organs that are fixable fixed with respect to the seat back, and that is also variable in its curvature by a tension bracket that can be lengthened or shortened by a first drive motor, where the tension bracket consists of upper and lower bracket regions (3a; 3b) acting on upper (1a) and lower end regions (1b) of the support plate (1), respectively, each said bracket region having thread regions of opposite handedness pointing toward one another which are externally engaged by a common rotatable sleeve (11) with appropriately designed meshing areas, characterized in that a first drive motor (10) is fixed to a gear case (2) arranged behind the support plate (1), and the first drive motor (10) drives gear wheels of a first gearbox, the first gearbox having a final gear wheel (13a) standing in engagement with the common rotatable sleeve (11), which has inside thread regions of opposite handedness.

2. A lumbar support in accordance with claim 1, characterized in that provided in addition to the first drive motor (10) for the curvature adjustment is a second drive motor (9) for height adjustment, the second drive motor arranged in parallel to the first drive motor (10), and both motors are fixed to the gear case (2), where the first and second drive motors (9; 10) each drive gear wheels of a first gearbox and a second gearbox, respectively, and the final gear wheel (13a) of the first gearbox stands in engagement with the sleeve (11), which has inside thread regions of opposite handedness, and where the second gearbox has a final gear wheel (16a) that stands in engagement with a second sleeve (17), which is rotatably mounted and has an inside thread that stands in engagement with an outside thread (4a) that is arranged on a bracket (4) that points in the direction of height adjustment and is fixable with respect to the seat back.

3. A lumbar support in accordance with claim 2, characterized in that the first and second drive motors (9; 10) have motor shafts that run parallel to one another and extend in the direction of height adjustment.

4. A lumbar support in accordance with claim 2 or 3, characterized in that the first and second drive motors (9; 10)

are followed by a reducing gear (9a; 10a), each reducing gear having a drive shaft (9b; 10b) aligned with the corresponding motor shaft, where the drive shafts (9b; 10b) bear bevel gears (15; 14) that mesh with corresponding bevel gears (16b; 13b) standing perpendicular thereto, which are connected via sleeve regions (16c; 13c) with final gear wheels (16a; 13a), of which one (16a) meshes with a bevel gear (17a) fixed on the second sleeve (17), and the other meshes with a bevel gear (12) fixed on the first sleeve (11).

5. A lumbar support in accordance with claim 4, characterized in that the gear case (2) consists of two identically formed case halves (2a; 2b) extending essentially parallel to the support plate (1), that lock together via molded snap-in tongues (2d) and complementary molded snap-in eyes (2c) to form a closed housing.

6. A lumbar support for a seat back, in particular a seat back of a motor vehicle seat, the lumbar support comprising:

a forward-bowed support plate (1) having an upper end region (1a) and a lower end region (1b), the support plate slidingly mounted on one or more guide organs (7, 8) that are oriented vertically on the seat back, the support plate for moving in an upward or downward direction along the guide adapted to be organs; and a tension bracket disposed within the forward-bowed support plate (1), the tension bracket driven by a first drive motor (10) to vary the length of the bracket, the tension bracket having an upper bracket region (3a) and a lower bracket region (3b) for engaging the upper and lower end regions of the support plate, respectively, to vary the curvature of the support plate when the length of the bracket is varied by the drive motor (10);

the upper and lower bracket regions (3a, 3b) having externally opposite handed threaded regions pointing toward one another;

the tension bracket further having a common rotatable sleeve (11) with upper and lower internally opposite handed threaded regions that engage the threaded regions of the upper and lower bracket regions (3a, 3b), respectively;

wherein the first drive motor (10) is fixed to a gear case (2) and drives gear wheels of a first gearbox, the first gearbox having a final gear wheel (13a) standing in engagement with the common rotatable sleeve (11) for rotating the sleeve, which in turn changes the distance between the upper and lower bracket regions and varies the length of the tension bracket to vary the curvature of the support plate.

7. A motor vehicle seat back having an adjustable lumbar support, the seat back comprising:

a seat back having one or more guide organs (7, 8) oriented vertically on the seat back;

a forward-bowed support plate (1) having an upper end region (1a) and a lower end region (1b), the support plate slidingly mounted on the guide organ(s) (7, 8), the support plate for moving in an upward or downward direction along the guide organs; and a tension bracket disposed within the forward-bowed support plate (1), the tension bracket driven by a first drive motor (10) to vary the length of the bracket, the tension bracket having an upper bracket region (3a) and a lower bracket region (3b) for engaging the upper and lower end regions of the support plate, respectively, to vary the curvature of the support plate when the length of the bracket is varied by the drive motor (10);

the upper and lower bracket regions (3a, 3b) having externally opposite handed threaded regions pointing toward one another;

the tension bracket further having a common rotatable sleeve (11) with upper and lower internally opposite handed threaded regions that engage the threaded regions of the upper and lower bracket regions (3a, 3b), respectively;

wherein the first drive motor (10) is fixed to a gear case (2) and drives gear wheels of a first gearbox, the first gearbox having a final gear wheel (13a) standing in engagement with the common rotatable sleeve (11) for rotating the sleeve, which in turn changes the distance between the upper and lower bracket regions and varies the length of the tension bracket to vary the curvature of the support plate.

* * * * *